Jan. 4, 1966  R. WEINSTEIN  3,227,837
ELECTRO-MAGNETIC CONTROLLED FLOW SWITCH
Filed Sept. 5, 1963  2 Sheets-Sheet 1

INVENTOR.
RICHARD WEINSTEIN
BY Albert F. Kronman
ATTORNEY

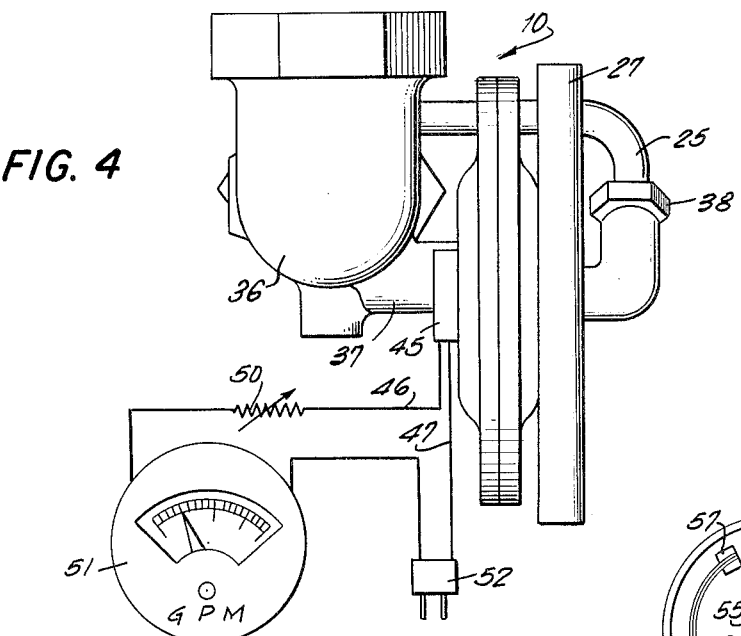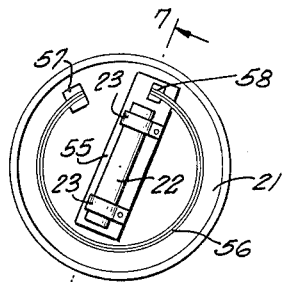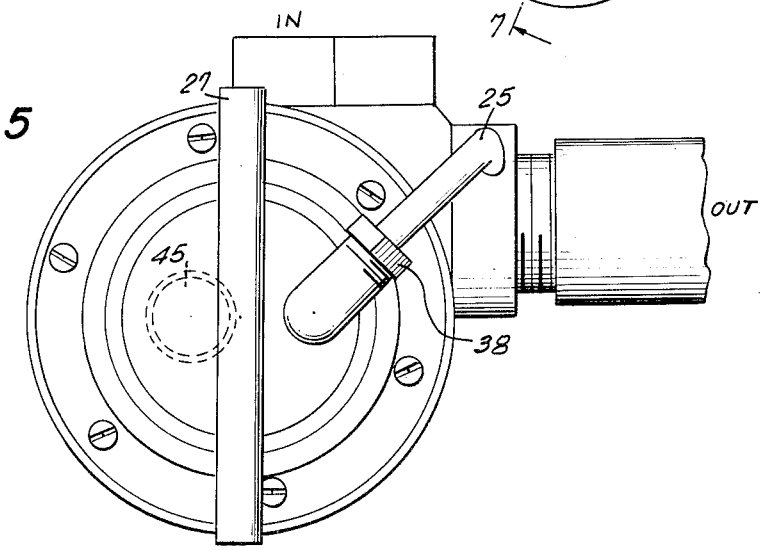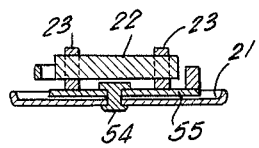

United States Patent Office
3,227,837
Patented Jan. 4, 1966

3,227,837
ELECTRO-MAGNETIC CONTROLLED
FLOW SWITCH
Richard Weinstein, Westbury, N.Y., assignor, by mesne assignments, to Commercial Factors, Ltd., Montreal, Canada
Filed Sept. 5, 1963, Ser. No. 306,894
3 Claims. (Cl. 200—81.9)

This invention relates to a fluid flow indicator for operating an electrical switch whenever the fluid flow increases above a predetermined amount. The invention also relates to a means for adjusting the sensitivity of a fluid flow device so that the operation of the switch can be adjusted for a wide range of flow values.

Electrical indication of the fluid flow in a conduit is important in many phases of operation in the chemical industry and in other installations involving the transfer of fluids. Prior art devices for measuring fluid flow include manometers, pressure gauges, connected to the high and low sides of an orifice, and some differential pressure gauges also associated with an orifice. These devices produce visual indications only and it is desirable to provide a positive control over other operating components so they may be switched into or out of a power circuit when the fluid pressure changes. The present invention is arranged for the sensitive operation of an electrical switch with the switch contacts housed in a container which is entirely separate from the conduits and chambers carrying the fluid. Alternate arrangements of the components of the invention include means for adjusting the sensitivity and means for operating a meter to indicate the fluid flow.

An object of the present invention is to provide an improved fluid flow indicator which avoids one or more of the disadvantages and limitations of prior art arrangements.

Another object of the present invention is to close an electrical circuit when the flow of a fluid in a conduit is above a predetermined amount.

Another object of the present invention is to reduce the cost of fluid flow indicators and make them more rugged.

Another object of the present invention is to measure the fluid flow in a conduit by showing the amount of flow on an electrical meter.

Another object of the present invention is to provide a means for adjusting the sensitivity of fluid flow indicators so that the electrical switch may be operated at flow values which may be within a 20 to 1 range of values.

Another object of the present invention is to compensate for the temperature of the fluid in the conduit and alter the sensitivity of the indicator responsive to the fluid temperature.

The invention comprises a conduit with an orifice for the passage of the fluid, the orifice producing a differential pressure responsive to the rate of fluid flow. A resilient diaphragm is mounted between two compartments with one compartment connected to the upstream side of the orifice and the other compartment connected to the down stream side. A magnet is secured to the diaphragm and arranged to move with it when the pressure changes. The magnet is positioned so as to operate a reed switch secured to the outside surface of one of the compartments.

The invention consists of the construction, combination and arrangement of parts, as herein illustrated, described and claimed.

In the accompanying drawings, forming a part hereof are illustrated several forms of embodiment of the invention, in which drawings similar reference characters designate corresponding parts, and in which:

FIGURE 4 is an end view of an alternate form of the fluid flow indicator.

FIGURE 5 is a plan view of one side of the diaphragm compartment showing the position of an external pick-up coil.

FIGURE 6 is a plan view of the magnet and its supporting structure arranged for temperature compensation.

FIGURE 7 is a cross-sectional view of the structure shown in FIGURE 8 and is taken along line 7—7 of that figure.

Figure 1:
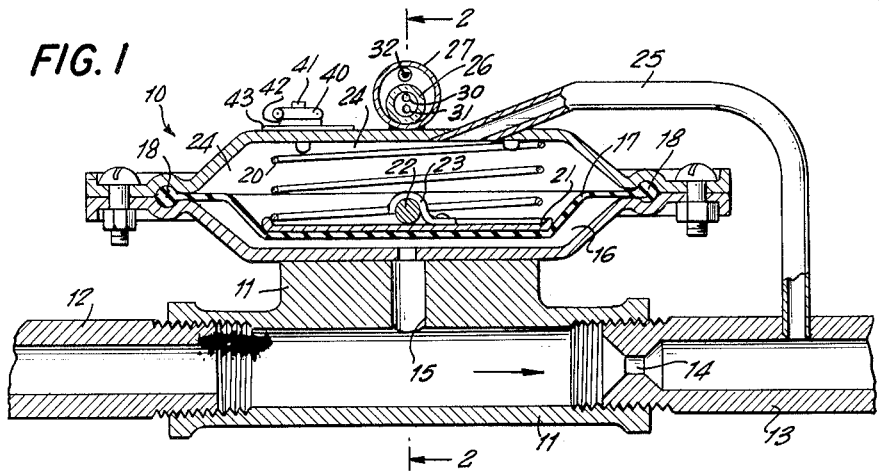
FIGURE 1 is a cross-sectional view of the fluid flow indicator, showing the resilient diaphragm, the orifice, the magnet, and the reed switch.
Figure 2:
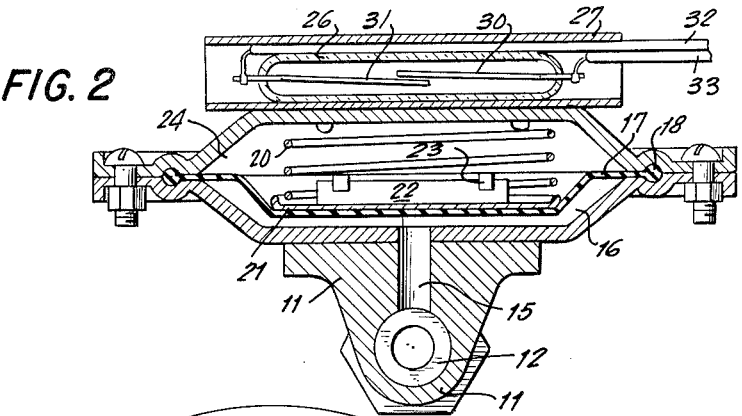
FIGURE 2 is a cross-sectional view of the flow indicator shown in FIGURE 1, and is taken along line 2—2 of that figure, looking in the direction of the arrows.
Figure 3:
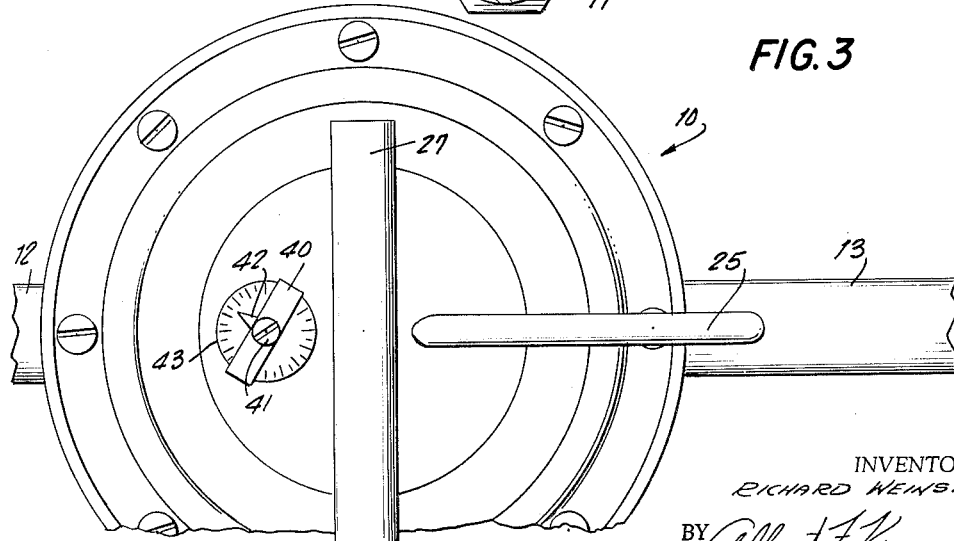
FIGURE 3 is a top view of the flow indicator shown in FIGURES 1 and 2.

Referring now to FIGURES 1, 2 and 3, a double compartmented indicator 10 is secured to a pipe fitting T 11, with means for attaching an input conduit 12 and an output conduit 13. The output conduit 13 is provided with a constricted portion 14 forming an orifice which creates a pressure differential when fluids are forced through it. The pipe fitting 11 includes a side connection 15 which connects with one compartment 16 of the indicator 10. Within the indicator body a molded resilient diaphragm 17 is secured. As shown in FIGURES 1 and 2, this diaphragm includes an integral O ring 18 formed at its periphery. While such a structure is preferred and gives excellent results, many other forms of diaphragm securing means may be employed. The diaphragm divides the interior of the indicator 10 into compartments, 16 and 24.

The diaphragm 17 is normally in the position shown in FIGURES 1 and 2 and is held in this position by a helical spring 20. The spring exerts its pressure against a flat metal disc 21 on the diaphragm provided with turned-over edges for holding the spring in place. At the center of the disc a permanent magnet 22 is positioned and held in place by one or more clips 23. It is obvious that the fluid indicator must be made of non-magnetic material and, in the design shown in FIGURES 1, 2 and 3, the only magnetic components are the magnet 22 and the two reeds 30, 31, in the reed switch.

A second compartment 24 is formed above the diaphragm 17 and this compartment is connected to conduit 13 by a small pressure pipe 25. This pipe is connected to conduit 13 on the downstream side of the orifice 14. The pressure pipe 25 is shown as a single unitary connection. For practical reasons, however, a coupling is generally provided between its two ends so that the assembly of this portion of the device is made easier.

Directly above the magnet 22 and parallel to it is a reed switch 28 positioned within a metal tube 27. Reed switches are well-known and include two magnetic reeds 30 and 31 which are normally spaced apart from each other but are moved to contact position under the influence of a magnetic field. The ends of the reeds 30, 31, are connected to electrical conductors 32 and 33 for connection to an external circuit which may be operated whenever the two reeds make contact.

The operation of this device is evident from the foregoing description. When there is no flow through conduits 12, 13, the pressure in compartment 16, is the same as the pressure in compartment 24, because each is subjected to the same pressure from the stationary fluid in conduits 11 and 13. The helical spring 20 maintains the magnet 22 in the position shown in FIGURES 1 and 2, and the reed switch is not actuated. Now let it be assumed that the fluid in conduits 11 and 13 is in motion, moving to the right as indicated by arrow 34. Because of the orifice 14, the pressure on the lower compartment 16 is greater than the pressure on the upper compartment 24 connected to the downstream conduit. Under these conditions the diaphragm and disc 21 are forced upward compressing the spring and the magnet 22 is brought closer to the reed switch. As the flow increases, the pressure increases and finally the permanent magnet 22 is brought close enough to the reed switch so that it is actuated and the two reeds 30 and 31 are brought together to complete a circuit in an external device.

If no other adjustment is provided, the device can operate to close the reed switch only at one predetermined rate of flow. While this may be sufficient for some installations, it is obvious that the utility of the device is greatly increased if the operational pressure can be varied over a considerable range. This is accomplished by attaching a second magnet 40 to the outside surface of the low pressure compartment 24, adjacent to the reed switch. The second magnet must obviously be small enough to have no direct effect on the switch. The permanent magnet 40 is secured to an adjusting screw 41 and coupled to a pointer 42. The pointer cooperates with a scale 43 which indicates the angular position of the small magnet. This magnet may be adjusted from a position which aids the magnetic lines of force set up by magnet 22 to a position 180 degrees from its first position so that its magnetic field repulses the magnetic field of magnet 22, and thereby cuts down the combined magnetic force which means that the diaphragm 17 and magnet 22 must be moved a much greater distance before the reed contacts are moved together. It has been formed by experiment that the sensitivity ratio of 20 to 1 may be obtained by adjusting this small magnet.

The fluid flow indicator shown in FIGURES 4 and 5 is substantially the same as the one shown in FIGURES 1, 2 and 3, except that the diaphrgam compartments 16, 24, are mounted external to the main conduit and several adjustable devices have been added. In this alternate version, the main conduit 36 contains a 90 degree bend and the upstream conduit connection 37 to the high pressure compartment is much smaller in diameter. In this view the low pressure pipe 25 is shown with a union coupling 38.

There may be times when an operator desires to sense the position of the diaphragm and thereby determine the amount of flow in the conduits. In order to supply this information a coil of wire 45 is added to the other side of the double chamber of the indicator 10. This coil is preferably mounted near the center of the compartment and close to the magnet 22. The ends 46, 47, of the wire coil 45 are connected in series with an adjustable resistor 50, an alternating current meter 51, and a plug 52 which is to be connected to a source of alternating current supply of 115 volts and 60 cycles.

The operation of the coil and meter is as follows: when the differential pressure is zero, that is: when the fluid flow is zero, the magnet 22 is close to the coil 45 and the impedance of the coil is a maximum. When the flow and the differential pressure increase, the diaphragm and the magnet are moved farther away from the coil and the reluctance and the impedance are both decreased and the current is increased. These vibrations in current can be observed by meter 51 which can be calibrated in gallons per minute or any other convenient flow designations.

It is well known that a temperature difference in the fluid flowing past a constricted orifice changes the pressure differential on the two sides of the orifice. To compensate for temperature changes, the adjustment shown in FIGURES 6 and 7, may be used. This structure includes a rotatable mounting for bar magnet 22 and includes a pivot 54 secured to metal disc 21. A supporting strip 55 is mounted on this pivot and the magnet 22 is secured to it by clips 23. The position of the strip 55 and magnet 22 is controlled by a bi-metallic element 56 which in this case is formed in a circular manner with one end secured to a clamp 57 and disc 21, while the other end is secured to a clamp 58 and one end of strip 55. Under normal conditions of temperature, magnet 22 remains in a position which is substantially parallel to the reed switch 27 but when the temperature changes by a considerable amount, the bi-metallic strip 56 changes its position and the position of the magnet, thereby compensating for the temperature difference and producing an action which is accurately responsive to the rate of flow. It is obvious that the bi-metallic strip may have other configurations.

As a further means for adjusting the operational characteristics of the indicator 10, the reed switch 26 may be slidably mounted within the tube 27. The necessary travel of the magnet 22 to control the reeds 30, 31, may thus be varied within desired and very close limits.

While the above described flow indicator was designed primarily for liquids it has been found that it works equally well with gases.

Having thus fully described the invention, what is claimed as new and desired to be secured by Letters Patent of the United States, is:

1. A fluid flow indicator for measuring the fluid flow through a conduit comprising, a conduit for the passage of fluid having a constricted orifice therein for producing a differential pressure responsive to the rate of fluid flow, a first compartment connected to said conduit on one side of the orifice for sensing the pressure therein, a second compartment adjoining the first and connected to the conduit on the other side of the orifice for sensing the pressure therein, a resilient diaphragm forming a common wall between said compartments and movable in response to pressure differences therebetween, a permanent magnet secured to said diaphragm and movable with it, a coil of wire mounted external to said compartments but adjacent to said permanent magnet, a measuring means connected to said coil of wire and responsive to the change of impedance of the coil, and a source of alternating current power connected to said measuring means.

2. A fluid flow indicator as claimed in claim 1, wherein a reed switch is mounted on one of said compartments and is adjacent to said permanent magnet for actuation by it.

3. A fluid flow indicator as claimed in claim 2, wherein a second permanent magnet is adjustably mounted on one of said compartments and adjacent to the first mentioned permanent magnet for altering the field strength of the first magnet.

References Cited by the Examiner

UNITED STATES PATENTS

| | | | |
|---|---|---|---|
| 2,600,309 | 6/1952 | MacDonald et al. | 200—81 |
| 2,628,296 | 2/1953 | Dillman | 200—81 |
| 3,000,216 | 9/1961 | Peters et al. | 73—398 |
| 3,046,370 | 7/1962 | Adams et al. | 200—93 X |
| 3,057,977 | 10/1962 | Caswell | 200—81 |

BERNARD A. GILHEANY, *Primary Examiner.*

H. M. FLECK, *Assistant Examiner.*